(12) United States Patent
Kim et al.

(10) Patent No.: US 9,434,269 B2
(45) Date of Patent: Sep. 6, 2016

(54) CHARGING DEVICE ASSEMBLY FOR ELECTRIC VEHICLE

(71) Applicant: LSIS CO., LTD., Anyang-si, Gyeonggi-do (KR)

(72) Inventors: Yong Woo Kim, Seoul (KR); Seung Woo Choi, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 147 days.

(21) Appl. No.: 14/310,958

(22) Filed: Jun. 20, 2014

(65) Prior Publication Data

US 2015/0015201 A1   Jan. 15, 2015

(30) Foreign Application Priority Data

Jul. 10, 2013 (KR) .................. 10-2013-0080726

(51) Int. Cl.
*H02J 7/00* (2006.01)
*B60L 11/18* (2006.01)

(52) U.S. Cl.
CPC ........ *B60L 11/1838* (2013.01); *B60L 11/1816* (2013.01); *B60L 11/1846* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ....................................... Y02T 90/14
USPC ........................................ 320/109
See application file for complete search history.

(56) References Cited

U.S. PATENT DOCUMENTS

2010/0156355 A1   6/2010   Bauerle et al.
2010/0211643 A1   8/2010   Lowenthal et al.
(Continued)

FOREIGN PATENT DOCUMENTS

| CN | 102891509 | 1/2013 |
| EP | 2548759 | 1/2013 |
| JP | 10-171555 | 6/1998 |

(Continued)

OTHER PUBLICATIONS

Japan Patent Office Application Serial No. 2014-141415, Office Action dated Apr. 15, 2015, 3 pages.
(Continued)

*Primary Examiner* — Suresh Memula
(74) *Attorney, Agent, or Firm* — Lee, Hong, Degerman, Kang & Waimey PC; Jonathan Kang; Justin Lee

(57) ABSTRACT

Provided is a charging device assembly for an electric vehicle. The assembly includes a cable connecting the electric vehicle to a power supply unit, a charge control device coupled with the cable, a main bracket, to which the charge control device is attached to be detachable, and an ad-on communication device couplable with the main bracket. Herein, the charge control device includes an ad-on communication unit for wireless short-distance communication. The ad-on communication device includes a charge control device communication unit for wireless short-distance communication with the charge control device and a terminal communication unit for wireless communication with a terminal displaying one of charging operation and state of the electric vehicle.

11 Claims, 8 Drawing Sheets

(56) References Cited

U.S. PATENT DOCUMENTS

| | | |
|---|---|---|
| 2011/0215758 A1 | 9/2011 | Stahlin et al. |
| 2013/0020990 A1* | 1/2013 | DeBoer ............... B60L 11/1824 320/109 |

FOREIGN PATENT DOCUMENTS

| | | |
|---|---|---|
| JP | 2004-252822 | 9/2004 |
| JP | 2010-061506 | 3/2010 |
| JP | 2012-105375 | 5/2012 |
| JP | 2012-228096 | 11/2012 |
| JP | 2013-094040 | 5/2013 |
| TW | 201244324 | 11/2012 |

OTHER PUBLICATIONS

European Patent Office Application Serial No. 14174082.9, Search Report dated Sep. 24, 2015, 8 pages.

The State Intellectual Property Office of the People's Republic of China Application Serial No. 201410328505.0, Dffice Action dated Dec. 18, 2015, 7 pages.

\* cited by examiner

CHARGING DEVICE ASSEMBLY FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0080726, filed on Jul. 10, 2013, the contents of which are all hereby incorporated by reference herein in its entirety.

BACKGROUND

Electric vehicles mean vehicles driven by using electricity and may be classified into battery powered electric vehicles and hybrid electric vehicles. In this case, battery powered electric vehicles are driven by only using electricity, which are generally designated as electric vehicles. Also, hybrid electric vehicles mean vehicles driven by using electricity and fossil fuel.

Also, electric vehicles as described above each include a battery for supplying electricity for driving. Particularly, battery-powered electric vehicles and plug-in hybrid electric vehicles charge a battery using power supplied from an external power supply and drives an electric motor using the power charged in the battery.

When one of electric vehicles described above charges a battery using prevailing power provided by a socket built in home, a charging device assembly for an electric vehicle is used.

The charging device assembly includes a connector connected to the electric vehicle, a plug connected to the socket, and a cable connecting the connector to the plug.

Also, a charge control device connected to the cable is included. The charge control device may be provided on the cable to be detachable or may be provided as a cable-integrated shape not to be easily separated from the cable.

The charge control device may be disposed outdoors while charging the electric vehicle. In this case, for stable charge, the charge control device itself is necessary to satisfy requirements of being resistant to an outside temperature, outside humidity, vibrations, and impacts.

The charge control device provides a user with various pieces of information related to charge. For example, information related to charge or failure information may be displayed through a light emitting diode (LED) having certain color.

Accordingly, when the charge is performed outdoors, the user is necessary to come close to a location within easy range of the eye of the user and to check a charge state or whether a failure is present.

This may cause inconvenience of the user. When weather conditions are poor, for example, when it is rainy or snowy or a temperature is too high or low, greater inconvenience may be caused.

SUMMARY

Embodiments provide a charging device assembly for an electric vehicle.

Embodiments also provide a charging device assembly for an electric vehicle, capable of providing charge-related information of the electric vehicle through wireless communication.

Embodiments also provide a charging device assembly for an electric vehicle, including a bracket and easily attaching or detaching other components forming the charging device assembly to or from the bracket.

In one embodiment, a charging device assembly for an electric vehicle includes a cable connecting the electric vehicle to a power supply unit, a charge control device coupled with the cable, a main bracket, to which the charge control device is attached to be detachable, and an ad-on communication device couplable with the main bracket. Herein, the charge control device includes an ad-on communication unit for wireless short-distance communication. The ad-on communication device includes a charge control device communication unit for wireless short-distance communication with the charge control device and a terminal communication unit for wireless communication with a terminal displaying one of charging operation and state of the electric vehicle. When the charge control device is coupled with the main bracket, the ad-on communication unit of the main bracket and the charge control device communication unit of the ad-on communication device are disposed adjacently in locations corresponding to each other.

The charge control device and the ad-on communication device may perform infrared (IR)-ray communication with each other.

The ad-on communication device may be attached to the main bracket to be detachable, and the ad-on communication unit of the charge control device may be disposed to be adjacent to one surface of the charge control device toward the ad-on communication device.

The charge control device may be attached to or detached from the main bracket while sliding.

The main bracket may include a bottom portion and side portions extended upwards from the bottom portion, and an ad-on communication device mounting portion available for allowing the ad-on communication device to be mounted thereon may be formed by allowing at least parts of the side portions to be layered.

The ad-on communication device may include a central portion extended left and right and a pair of side portions extended forward and backward from the central portion, and the charge control device may be located between the pair of side portions.

The side portion may be provided with a first guide portion on a bottom thereof. The main bracket may be provided with a second guide portion in a location corresponding to the first guide portion. The first guide portion and the second guide portion may be guided in contact with one another and may be slidable.

To charge the electric vehicle, the assembly may further include an electric vehicle connector connected to the electric vehicle to charge the same and a sub-bracket provided outside the side portion of the main bracket to allow the electric vehicle connector to be mounted.

The sub-bracket may include a connector insertion unit for allowing at least a part of the electric vehicle connector to be inserted therein and a cable bracket extended outwards to allow the cable to be mounted thereon.

The bottom portion may be formed with a cable pass portion allowing the cable to pass therein.

The side portion may include a back side portion located backward, a pair of side portions located left and right, and a front side portion located forward, and the back side portion may be higher than the left and right side portions and the front side portion.

The ad-on communication device mounting portion may include a first ad-on communication device mounting portion projecting upwards from a corner, at which the pair of left and right side portions and the front side portion meet one another and having a layered shape at a part of a projection and a second ad-on communication device mounting portion formed by allowing a part of the back side portion to be dented backward.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments will be described in detail with reference to the attached drawings. Terms "module' and "portion" used for components are given or mixed with each other only considering easiness of drafting the specification, which do not have mutually distinguished meanings or roles as themselves.

Figure 1:
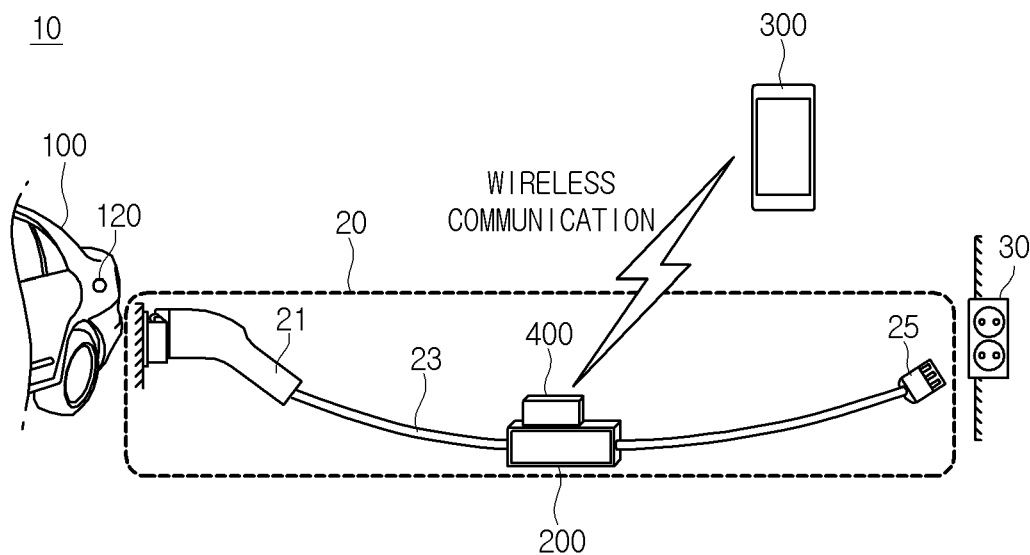
FIG. 1 is a conceptual diagram of a system for charging an electric vehicle according to an embodiment.

FIG. 1 is a conceptual diagram of a system 10 for charging an electric vehicle 100 using a charging device assembly therefore according to an embodiment.

Referring to FIG. 1, the system 10 includes the electric vehicle 100, a charging cable assembly 20 for the electric vehicle 100, a terminal 300, and a socket 30.

The socket 30 is a power supply unit providing alternate current (AC) power. The AC power supplied through the socket 30 may be prevailing power having a frequency of about 60 Hz. However, not limited thereto, AC power having a frequency of about 50 Hz or other frequency may be supplied or direct current (DC) power may be supplied.

The electric vehicle 100 is connected to the socket 30 through the charging cable assembly 20 and is provided with power from the socket 30.

The charging cable assembly 20 transmits the power from the socket 30 to the electric vehicle 100.

The charging cable assembly 20 includes an electric vehicle connector 21, a power cable 23, a cable plug 25, a charge control device 200, and an ad-on communication device 400.

The electric vehicle connector 21 is coupled with one end of the power cable 23, is inserted into and coupled with an inlet 120 of the electric vehicle 100. The electric vehicle connector 21, for example, may be in accordance with standards of SAE J1772.

The power cable 23 transmits power. The cable plug 25 may be coupled with an end of the power cable 23 and may be inserted into and coupled with the socket 30.

The charge control device 200 monitors the charge of the electric vehicle 100, provides the ad-on communication device 400 with charge-related information obtained through monitoring, and controls the charge of the electric vehicle 100. The charge control device 200 may be attached to the power cable 23 to be integrated thereto not to be easily separated from the power cable 23 or may be provided to be detachable according to a user. The charge control device 200 has characteristics of being resistant to an outside temperature, outside humidity, vibrations, and impacts. When the charge control device 200 includes a connector for wired communication, since including a metal terminal, the connector may be vulnerable to external environments. To overcome this, the charge control device 200 may wirelessly communicate with the ad-on communication device 400.

The ad-on communication device 400 is disposed adjacent to the charge control device 200 and performs wireless communication with the charge control device 200.

Also, the terminal 300 receives the charge-related information of the electric vehicle 100 from the charging cable assembly 20 through wireless communication and displays the charge-related information to the user. In more detail, the terminal 300 receives the charge-related information from the ad-on communication device 400 through the wireless communication. Also, the terminal 300 may receive information inputted from the user.

Hereinafter, referring to FIGS. 2 to 5, respective components forming the system for charging the electric vehicle 100 will be described in detail. That is, the electric vehicle 100, the charging cable assembly 20, the terminal 300, and the socket 30 will be described in detail.

Figure 2:
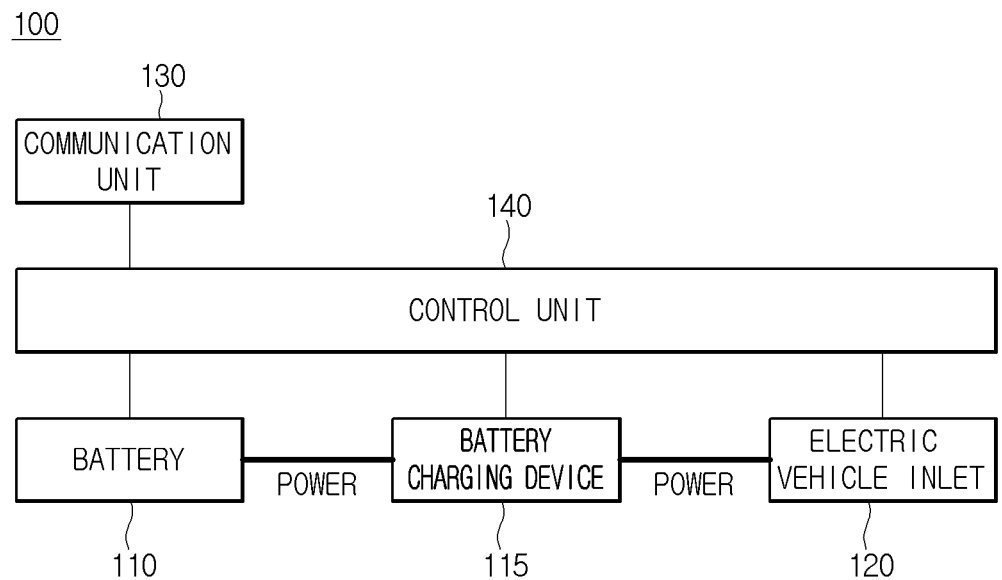
FIG. 2 is a block diagram of the electric vehicle of FIG. 1.

FIG. 2 is a block diagram of the electric vehicle 100.

The electric vehicle 100 includes a battery 110, a battery charging device 115, the inlet 120, a communication unit 130, and a control unit 140.

The battery 110 provides the electric vehicle 100 with power for driving the electric vehicle 100.

The inlet 120 is a connector for receiving power for charging the battery 110 from the outside. The inlet 120 may be in accordance with standards of SAE J1772.

The battery charging device 115 charges the battery 110 using the power provided through the inlet 120.

The communication unit 130 may communicate with one of the charging cable assembly 20 and the terminal 300.

The control unit 140 controls overall operations of the electric vehicle 100.

Hereinafter, referring to FIGS. 3 and 4, the charging cable assembly 20 will be described in detail.

The charging cable assembly 20 includes the electric vehicle connector 21, the power cable 23, the cable plug 25, the charge control device 200, and the ad-on communication device 400.

Figure 3:
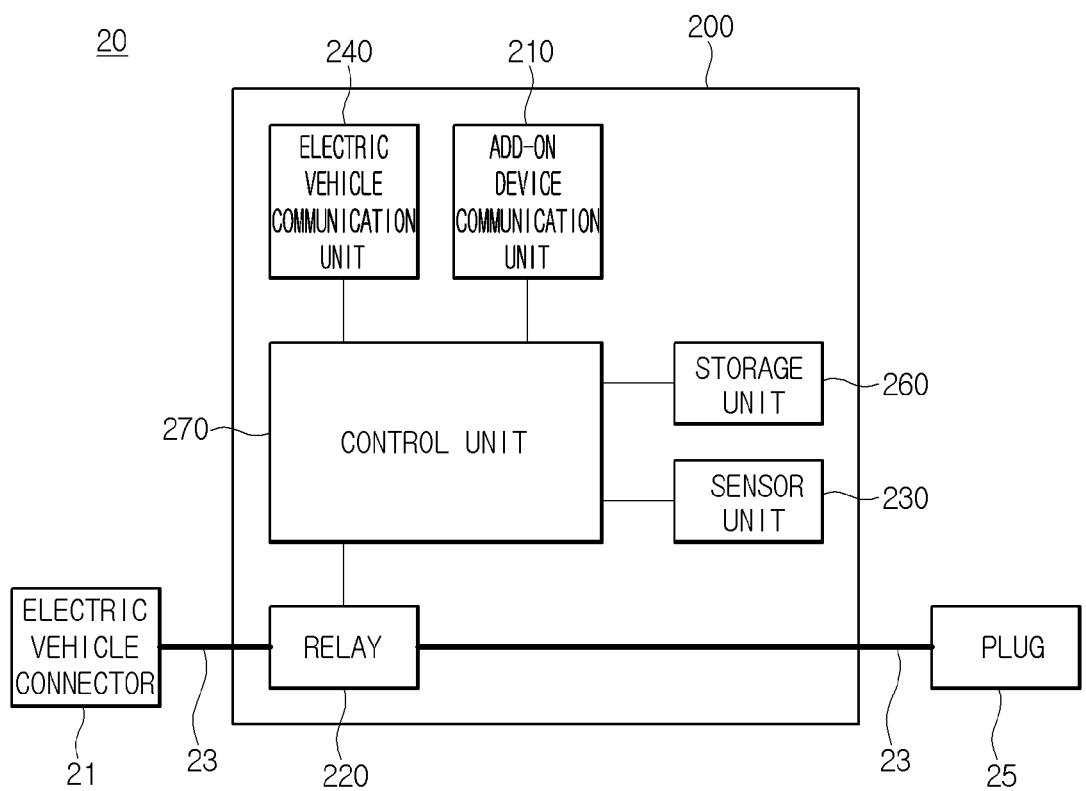
FIG. 3 is a block diagram of a charging cable assembly for the electric vehicle shown in FIG. 1.

FIG. 3 is a block diagram of the charge cable assembly 20. In FIG. 3, the charge control device 200 is mainly illustrated and a detailed configuration of the ad-on communication device 400 is omitted. Referring to FIG. 3, the charging cable assembly 20 will be described with the charge control device 200 in priority. Referring to FIG. 4, the ad-on communication device 400 will be described in detail.

Referring to FIG. 3, the charge control device 200 includes an ad-on device communication unit 210, a relay 220, a sensor unit 230, an electric vehicle communication unit 240, a storage unit 260, and a control unit 270.

The relay 220 controls interruption of transmission of power through the power cable 23. In detail, when being turned off, the relay 220 cuts off the transmission of power through the power cable 23. In detail, when being turned on, the relay 220 provides the transmission of power through the power cable 23.

The sensor unit 230 senses the charge-related information of the electric vehicle 100, which will be described later. Particularly, the sensor unit 230 may sense all pieces of information related to the electric vehicle 100 and the charging cable assembly 20. The sensor unit 230 may sense information related to the charging cable assembly while not sensing the information related to the electric vehicle 100. In detail, the sensor unit 230 may include a relay fusion sensor, a current sensor, an internal temperature sensor, an internal humidity sensor, an external temperature sensor, an external humidity sensor, a short circuit sensor, and a disconnection sensor. The relay fusion sensor may sense whether the relay 220 is fused. The current sensor may sense a level of a current flowing through the power cable 23. The internal temperature sensor may sense an internal temperature of the charging cable assembly 20. The internal humidity sensor may sense internal humidity of the charging cable assembly 20. The external temperature sensor senses a peripheral temperature of the charge control device 200. The external humidity sensor senses peripheral humidity of the charge control device 200. The short circuit sensor may sense whether the charging cable assembly 20 short-circuits. The disconnection sensor may sense whether the charging cable assembly 20 is disconnected.

The electric vehicle communication unit 240 performs communication with the electric vehicle 100. In detail, the electric vehicle communication unit 240 communicates with the communication unit 130 of the electric vehicle 100. The electric vehicle communication unit 240 and the communication unit 130 may communicate with each other through the power cable 23 using a cable-based communication method. Also, the electric vehicle communication unit 240 and the communication unit 130 may communicate with each other using one of an infrared data association (IrDA) method, a radio frequency communication method, Bluetooth, ultra wideband (UWB), ZigBee, a digital living network alliance (DLNA), etc.

The storage unit 260 stores various pieces of information described later. In detail, the storage unit 260 may store information related to charging the electric vehicle 100. The storage unit 260 may store information related to history of using the charge control device 200. For example, the storage unit 260 may store information related to a final time of using the charge control device 200, an amount of time of using the charge control device 200, and an accumulated amount of time of using the charge control device 200.

The control unit 270 may control the overall operation of the charge control device 200 including operations described later.

Also, the charge control device 200 further includes the ad-on device communication unit 210.

The ad-on device communication unit 210 performs communication with the ad-on communication device 400. Also, the ad-on device communication unit 210 and the ad-on communication device 400 may communicate with each other using one of an IrDA method, a radio frequency communication method, Bluetooth, a UWB, ZigBee, a DLNA, etc.

Particularly, to decrease costs of the charging cable assembly 20 and the ad-on communication device 400, the ad-on device communication unit 210 may use the IrDA method. Herein, the ad-on device communication unit 210 may include an infrared (IR) light emitting diode (LED) and an IR light receiving diode.

Figure 4:
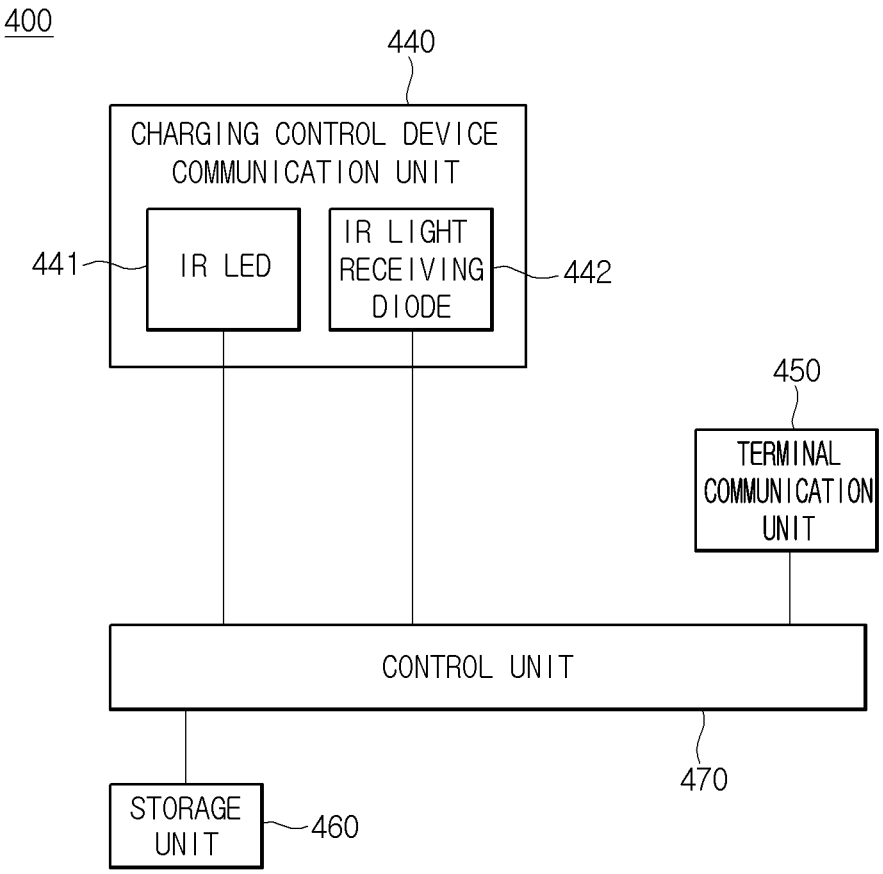
FIG. 4 is a block diagram of an ad-on communication device shown in FIG. 1.

FIG. 4 is a block diagram of the ad-on communication device 400.

The ad-on communication device 400 includes a charge control device communication unit 440, a terminal communication unit 450, a storage unit 460, and a control unit 470.

The charge control device communication unit 440 performs communication with the charge control device 200. In detail, the charge control device communication unit 440 communicates with the ad-on device communication unit 210 of the charge control device 200. The charge control device communication unit 440 and the ad-on device communication unit 210 may communicate with each other using one of an IrDA method, a radio frequency communication method, Bluetooth, an UWB, ZigBee, a DLNA, etc.

To decrease costs of the charging cable assembly 20 and the ad-on communication device 400, the charge control device communication unit 440 may use the IrDA method. Herein, the charge control device communication unit 440 may further include an IR LED 441 and an IR light receiving diode 442.

When the ad-on communication device 400 is disposed to be adjacent to a location performable for wireless short-distance communication with the charge control device 200, locations of the IR LED 441 and the IR light receiving diode 442 of the charge control device communication unit 440 are matched with the IR receiving diode and the IR LED of the ad-on device communication unit 210 of the charge control device 200, respectively.

The storage unit 460 stores various pieces of information as follows. In detail, the storage unit 460 may store information related to charging the electric vehicle 100. The storage unit 460 may store information related to history of using the charge control device 200. For example, the storage unit 460 may store information related to a final time of using the charge control device 200, an amount of time of using the charge control device 200, and an accumulated amount of time of using the charge control device 200.

The control unit 470 may control the overall operation of the ad-on communication device 400 including operations described later.

The ad-on communication device 400 and the charge control device 200 may be provided with power through a built-in battery.

Figure 5:
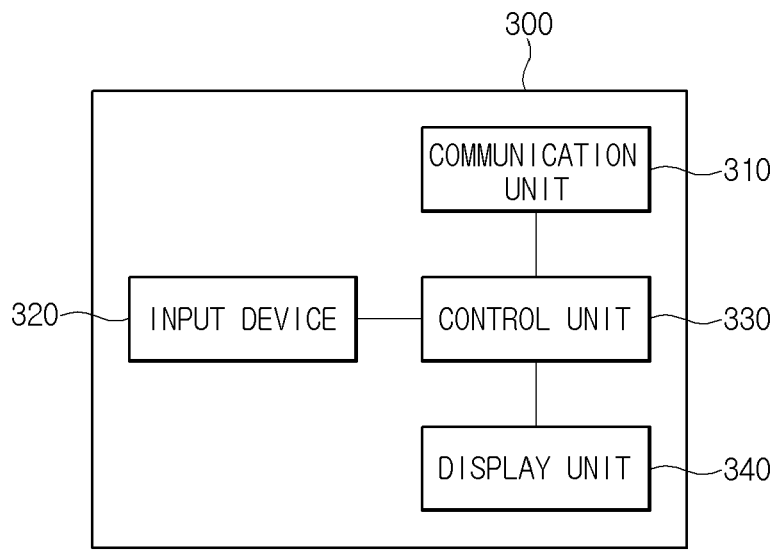
FIG. 5 is a block diagram of a terminal shown in FIG. 1.

FIG. 5 is a block diagram of the terminal 300.

A terminal herein may be one of mobile terminals such as a cellular phone, a smart phone, a laptop computer, a digital-broadcasting terminal, personal digital assistants (PDA), a portable multimedia player (PMP), and a navigator. Also, the terminal may be one of fixed terminals such as a digital television and a desktop computer.

Also, the terminal 300 wirelessly communicates with the ad-on communication device 400 using a non-contact method and displays information on the charging cable assembly 20.

The terminal 300 includes a communication unit 310, an input device 320, a control unit 330, and a display unit 340.

The communication unit 310 communicates with a terminal communication unit 250.

The input device 320 receives user input. The input device 320 may include one or more of a touch screen, a physical button, a microphone for obtaining the user input such as a voice, an acceleration sensor for obtaining a movement or a gesture of the terminal 300 as the user input, a keyboard, a mouse, and a keypad.

The control unit 330 may control the overall operation of the terminal 300 including operations described later.

The display unit 340 displays information on charging operation and state of the charge control device 200. Also, the display unit 340 may display information on a failure of the charge control device 200 and action of the user corresponding thereto. For example, the display unit 340 may display the information on charging operation and state of the charge control device 200 using a visual display method including at least one selected from a letter, a figure, and light and/or an auditory display method including a sound.

Figure 6:
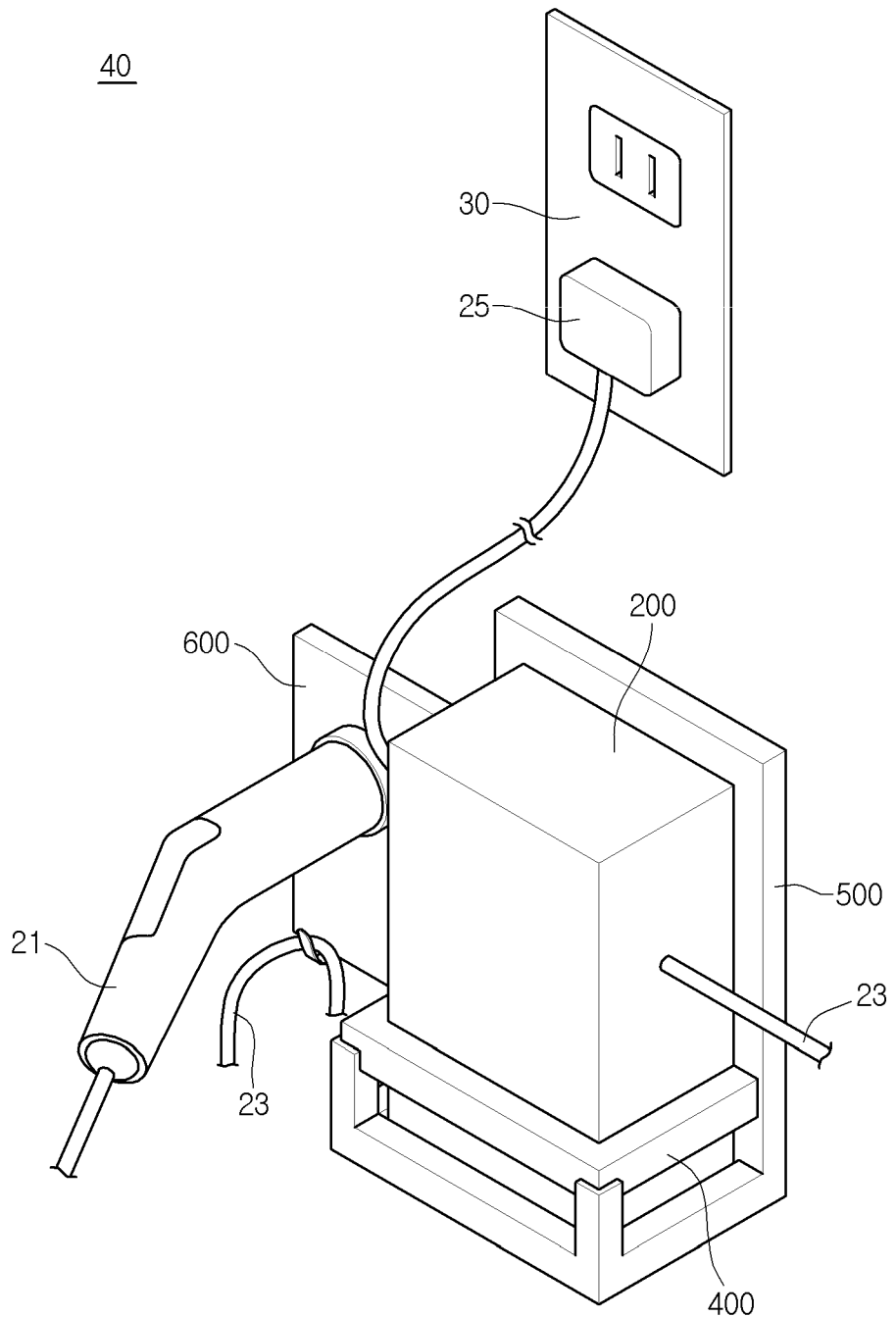
FIG. 6 is a perspective view of a charging device assembly for the electric vehicle according to an embodiment.
Figure 7:
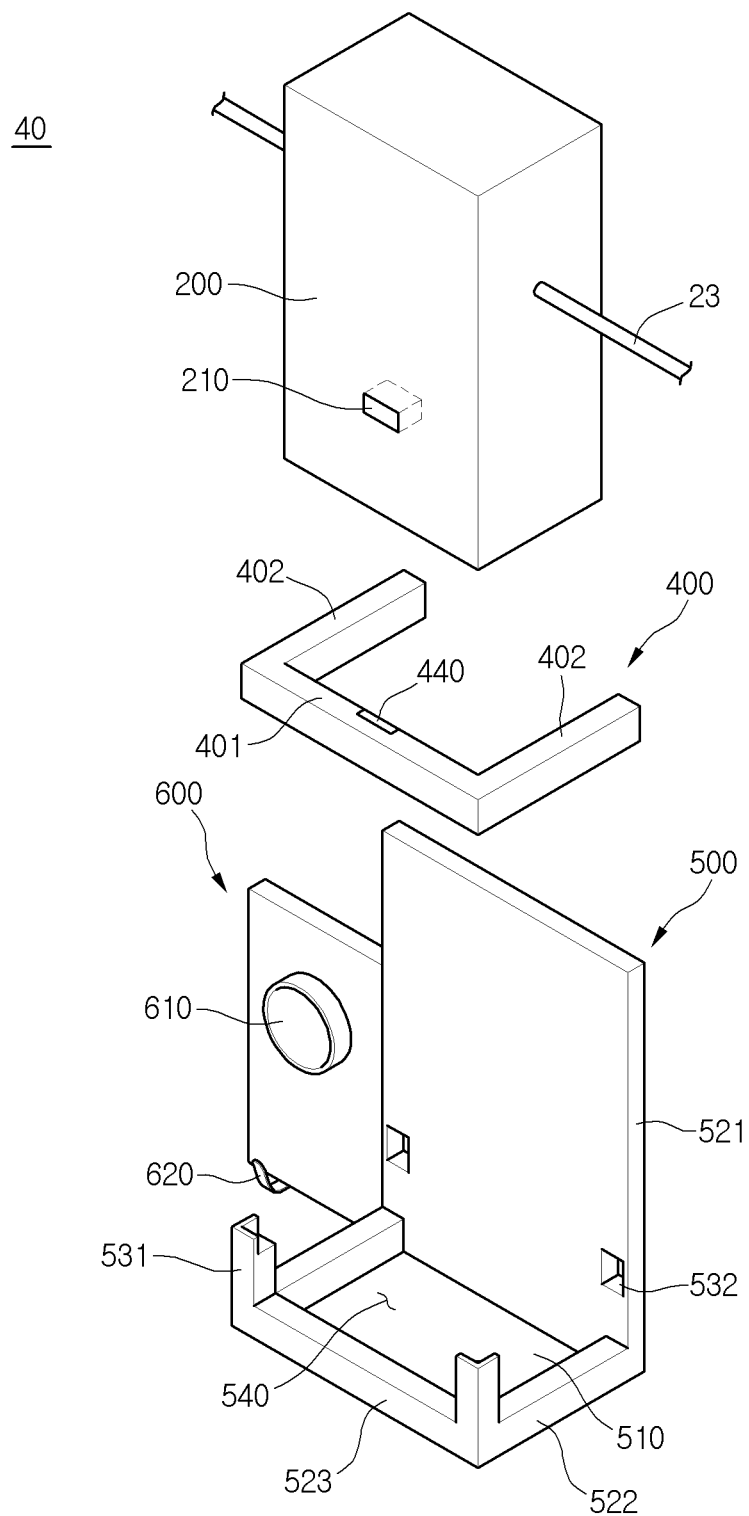
FIG. 7 is an exploded-perspective view of the charging device assembly of FIG. 7.

FIG. 6 is a perspective view of a charging device assembly 40 for the electric vehicle 100 according to an embodiment. FIG. 7 is an exploded perspective view of the charging device assembly 40.

The charging device assembly 40 includes the charging cable assembly 20 described above, a main bracket 500, and a sub-bracket 600.

However, since the charging cable assembly 20 includes the electric vehicle connector 21, the power cable 23, and the cable plug 25, the charge control device 200, and the ad-on communication device 400, the charging device assembly 40 is allowed to include the electric vehicle connector 21, the power cable 23, and the cable plug 25, the charge control device 200, the ad-on communication device 400, the main bracket 500, and the sub-bracket 600.

Among them, configurations of the electric vehicle connector 21, the power cable 23, and the cable plug 25, the charge control device 200, and the ad-on communication device 400 are identical to the described above.

Accordingly, hereinafter, referring to FIGS. 6 and 7, shapes of the charge control device 200 and the ad-on communication device 400 will be briefly described and then configurations of the main bracket 500 and the sub-bracket 600 will be described in detail.

The charge control device 200 is connected with a cable at both ends thereof and is provided with the ad-on device communication unit 210, the relay 220, the sensor unit 230, the electric vehicle communication unit 240, and the storage unit 260 therein as described above. Among them, the ad-on communication unit 210, as shown in FIG. 7, is disposed to be adjacent to an outer surface. In more detail, the ad-on device communication unit 210 is disposed to be adjacent to one side facing the charge control device communication unit 440 of the ad-on communication device 400.

The ad-on communication device 400 has an approximate ⊏ shape. That is, a central portion 401 extended left and right and a side portion 402 extended backwards from left and right ends of the central portion 401 are included. Herein, in the ad-on communication device 400, as described above, an attachment check request signal generation unit 410, an attachment check unit 420, the charge control device communication unit 440, the terminal communication unit 450, the storage unit 460, and the control unit 470 are provided. Among them, the charge control device communication unit 440 is disposed to be adjacent to one side surface. In more detail, the charge control device communication unit 440 is disposed in a location corresponding to the ad-on device communication unit 210 of the charge control device 200 to be adjacent to the ad-on device communication unit 210. For example, the charge control device communication unit 440 may be disposed near a center of the central portion 401 of the ad-on communication device 400 to be adjacent to a backward outer surface.

The main bracket 500 includes a bottom portion 510, side portions 521, 522, and 523, ad-on communication device mounting portions 531 and 532, and a charge control device containing portion 540.

The bottom portion 510 is formed as an approximate panel shape and is extended laterally.

The side portions 521, 522, and 523 are extended upwards from edges of the bottom portion 510. The side portions 521, 522, and 523 include a back side portion 521 located backwards, a pair of left and right side portions 522 located left and right, and a front side portion 523. Herein, the back side portion 521, the left and right side portions 522, and the front side portion 523 may be extended to have mutually different heights. Referring to FIGS. 6 and 7, the back side portion 521 is relatively higher and the left and right side portions 522 and the front side portion 523 are relatively lower.

The ad-on communication device mounting portions 531 and 532 may be formed by layering parts of the side portions. The ad-on communication device mounting portions 531 and 532 includes a first ad-on communication device mounting portion 531 and a second ad-on communication device mounting portion 532.

The first ad-on communication device mounting portion 531 is provided on both left and right ends of a front end of the main bracket 500 as a pair thereof. The first ad-on communication device mounting portions 531 project upwards from corners, at which the pair of left and right side portions 522 meet the front side portion 523, respectively, and parts of projecting portions are layered inwards. Frontal left and right corners of the ad-on communication device 400 are located at the layered parts.

The second ad-on communication device mounting portions 532 are formed by allowing parts of the back side portion 521 to be dented backwards. Back ends of the ad-on communication device 400 are inserted into the second ad-on communication device mounting portions 532.

The charge control device containing portion 540 becomes an inner space surrounded by the bottom portion 510 and the side portions 521, 522, and 523.

On the other hand, the sub-bracket 600 may be provided on an outside of the left and right side portions 522. The sub-bracket 600 is formed with a connector insertion unit 610 available for inserting the electric vehicle connector 21. An opening of the connector insertion unit 610 may be formed on a side or a front thereof.

Also, the sub-bracket 600 may be provided with a cable bracket 620. The cable bracket 620 may have a shape projecting forward and then bent upwards. The cable bracket 620, as shown in FIG. 6, may allow the power cable 23 to be rolled up thereon.

Hereinafter, operations of the charging device assembly 40 having a configuration described above will be described.

When purchasing an electric vehicle, a user of the electric vehicle elementarily has the electric vehicle connector 25 and the charge control device 200 attached to the power cable 23. However, the terminal 300, the ad-on communication device 400, the main bracket 500, and the sub-bracket 600 may be purchased and possessed or may not be purchased depending on a selection of the user.

That is, when to check charging operation and state of the electric vehicle at a long range, the user may additionally purchase the terminal 300, the ad-on communication device 400, and the main bracket 500, and the sub-bracket 600 and use them together with the charge control device 200, thereby obtaining desired information. However, when not want to check, the user, without purchasing additional devices, may come close to the charge control device 200 and may check a charge state displayed on the charge control device 200 with the naked eye.

That is, communication between the charge control device 200 and the ad-on communication device 40 may be provided through a wireless short-distance communication device such as an IR-ray communication device and communication between the ad-on communication device 400 and the terminal 300 may be provided through a relatively higher-priced communication device.

In other words, when manufacturing and selling the charge control device 200, since the cost thereof is not so increased although including components for wireless short-distance communication with the ad-on communication device 400, the components are allowed to be elementarily built therein. However, relatively higher-priced components for communication with the terminal 300 are not built in and users who need functions described above are allowed to purchase later the ad-on communication device 400.

According thereto, a consumer who does not want to pay high expenses may charge the electric vehicle without the ad-on communication device 400. Otherwise, a consumer who wants to check charging state and operation of the electric vehicle at a long range regardless of relatively higher expenses may purchase the ad-on communication device 400 and the terminal 300 to obtain desired functions.

When the user purchases the terminal 300, the ad-on communication device 400, the main bracket 500, and the sub-bracket 600, the main bracket 500 and the sub-bracket 600 as in the embodiment may be installed adjacently to a place where the electric vehicle is parked. For example, the main bracket 500 and the sub-bracket 600 may be attached to an inner wall of a garage or an outer wall of a building adjacent to a parking lot. Also, an additional stand for mounting the main bracket 500 and the sub-bracket 600 may be formed to mount the main bracket 500 and the sub-bracket 600 thereon.

Herein, the main bracket 500 and the sub-bracket 600 may be installed near a power supply unit available for supplying prevailing power. The power supply unit may be the socket 30.

The user connects the cable plug 25 provided on one end of the power cable 23 to the socket 30, which is the power supply unit, and connects the electric vehicle connector 21 to the electric vehicle, thereby charging the electric vehicle.

While charging the electric vehicle, all the charge control device 200 and the ad-on communication device 400 may be mounted on the main bracket 500.

The ad-on communication device 400 is mounted on the ad-on communication device mounting portions 531 and 532 of the main bracket 500. While the back ends are being inserted into the second ad-on communication device mounting portions 532, the left and right corners near a front end are mounted on the first ad-on communication device mounting portions 531. Herein, the ad-on communication device 400 may be fixed to the main bracket 500.

After that, the charge control device 200 is allowed to move from a top to a bottom of the main bracket 500. Then, the charge control device 200 moves downwards while sliding in the side portions 521, 522, and 523 of the main bracket 500 and becomes located in the charge control device containing portion 540. Herein the charge control device 200 is located while being inserted into a space surrounded by the ad-on communication device 400 having the approximate ⊏ shape.

On the other hand, while the charge control device 200 and the ad-on communication device 400 are coupled with the main bracket 500, the ad-on device communication unit 210 of the charge control device 200 and the charge control device communication unit 440 of the ad-on communication device 400 are located adjacent to locations corresponding to each other. In more detail, the ad-on device communication unit 210 is disposed in the charge control device 200 to be adjacent to an outer surface, that is, to be adjacent to the ad-on communication device 400 and the charge control device communication unit 440 is disposed in the ad-on communication device 400 to be adjacent to the charge control device 200.

Accordingly, the user may allow communication between the charge control device 200 and the ad-on communication device 400 to be available only by mounting the charge control device 200 on the main bracket 500 without additional operation for coupling the charge control device 200 with the ad-on communication device 400. That is, the location allows wireless short-distance communication such as IR-ray communication between the charge control device 200 and the ad-on communication device 400 to be smoothly performed.

Accordingly, the electric vehicle connector 21 is connected to the electric vehicle and the cable plug 25 is connected to the socket 30, respectively, and then the charge control device 200 is mounted on the main bracket 500, thereby checking the charging operation and state of the electric vehicle through the terminal 300 while being indoors or in a long distance.

On the other hand, when not being charged, the electric vehicle connector 21 is inserted into the insertion unit 610 of the sub-bracket 600 and the power cable 23 is rolled up on the cable bracket 620 to be stored, thereby being neatly arranged and stored.

On the other hand, widths of the back side portion 521 and the ad-on communication device mounting portion 531 may be approximately identical to a diameter of the power cable 23.

Also, a width between the left and right side portions 522 of the main bracket 500 may be approximately identical to a width between left and right sides of the charge control device 200.

Hereinafter, referring to FIGS. 8 and 9, a configuration of a charging device assembly 50 according to another embodiment will be described.

The charging device assembly 50 includes a main bracket 700 and the sub-bracket 600 in addition to the charging cable assembly 20 described above.

Since other components are identical to the described with reference to FIGS. 6 and 7, shapes of the charge control device 200 and the ad-on communication device 400 will be briefly described and then configurations of the main bracket 700 and the sub-bracket 600 will be described in detail.

The charge control device 200 is connected with a cable at both ends thereof and is provided with the ad-on device communication unit 210, the relay 220, the sensor unit 230, the electric vehicle communication unit 240, and the storage unit 260 therein as described above. Among them, the ad-on device communication unit 210 is disposed to be adjacent to an outer surface. In more detail, the ad-on device communication unit 210 is disposed to be adjacent to the charge control device communication unit 440 of the ad-on communication device 400.

The ad-on communication device 400a has an approximate ⊏ shape. That is, the ad-on communication device 400a includes a central portion 401a extended left and right and a side portion 402a extended forward from left and right ends of the central portion 401a. Also, the ad-on communication device 400a includes a first guide portion 450a provided on a bottom of the side portion 402a. The first guide portion 450a projects toward a bottom of the side portion 402a and is extended forward and backward.

Herein, in the ad-on communication device 400a, a charge control device communication unit 440a Among them, the charge control device communication unit 440a is disposed to be adjacent to one side surface. In more detail, the charge control device communication unit 440a is disposed in a location corresponding to the ad-on device communication unit 210 of the charge control device 200 to be adjacent to the ad-on device communication unit 210. For example, the charge control device communication unit 440a may be disposed near a center of the central portion 401a of the ad-on communication device 400 to be adjacent to a backward outer surface.

The main bracket 700 includes a bottom portion 710, side portions 721, 522, and 523 extended upwards from the bottom portion 710, an ad-on communication device mounting portion 730 containing the ad-on communication device 400a, a charge control device containing portion 740 containing the charge control device 200, and a second guide portion 750.

The bottom portion 710 has an approximate flat panel shape. The bottom portion 710 is provided with a cable pass portion 711. The cable pass portion 711 is formed by cutting the bottom portion 710 inwards from one end with a certain distance.

The side portions 721, 522, and 523 include a back side portion 721 located backward, a pair of left and right side portions 722 located left and right, and a front side portion 723. Herein, the back side portion 721, the left and right side portions 722, and the front side portion 723 may be extended to have mutually different heights. Referring to FIGS. 8 and 9, the back side portion 721 is relatively higher and the left and right side portions 722 and the front side portion 723 are relatively lower.

The ad-on communication device mounting portion 730 may be formed by allowing one of the bottom portion 710 and the side portions 721, 522, and 523 to be dented. In the embodiment, a middle part of the back side portion 721 is dented backward, thereby forming the ad-on communication device mounting portion 730. The ad-on communication device 400 moves backward and is inserted into and coupled with the ad-on communication device mounting portion 730.

The charge control device containing portion 740 becomes an inner space surrounded by the bottom portion 710 and the side portions 721, 522, and 523.

The second guide portion 750 supports sliding of the charge control device 200 while the charge control device 200 is sliding on and being coupled with the main bracket 700. That is, the second guide portion 750 guides the movement of the charge control device 200. The second guide portion 750 may be extended along a direction, in which the charge control device 200 moves, for example, forward and backward.

Figure 8:
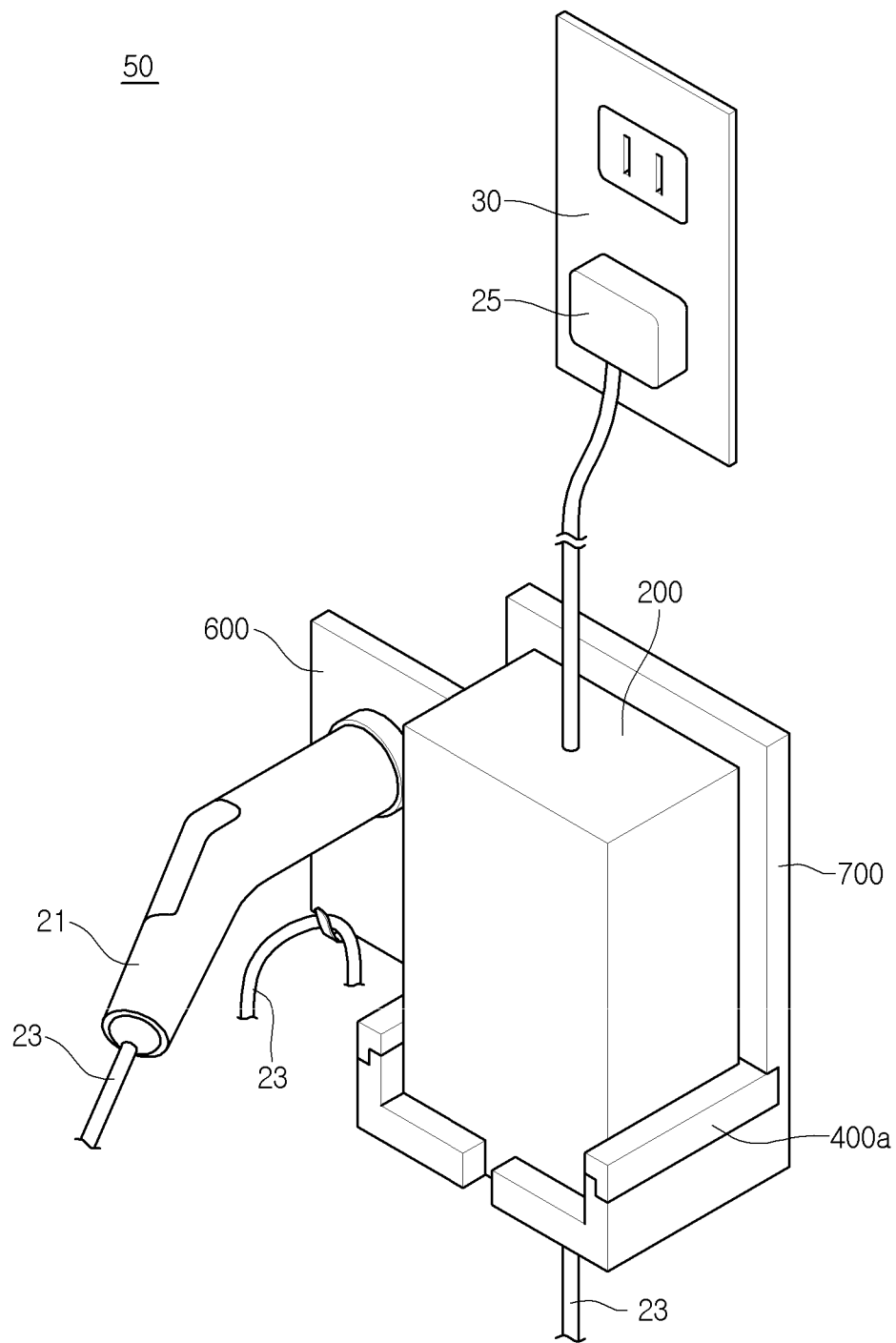
FIG. 8 is a perspective view of a charging device assembly for the electric vehicle according to another embodiment.
Figure 9:
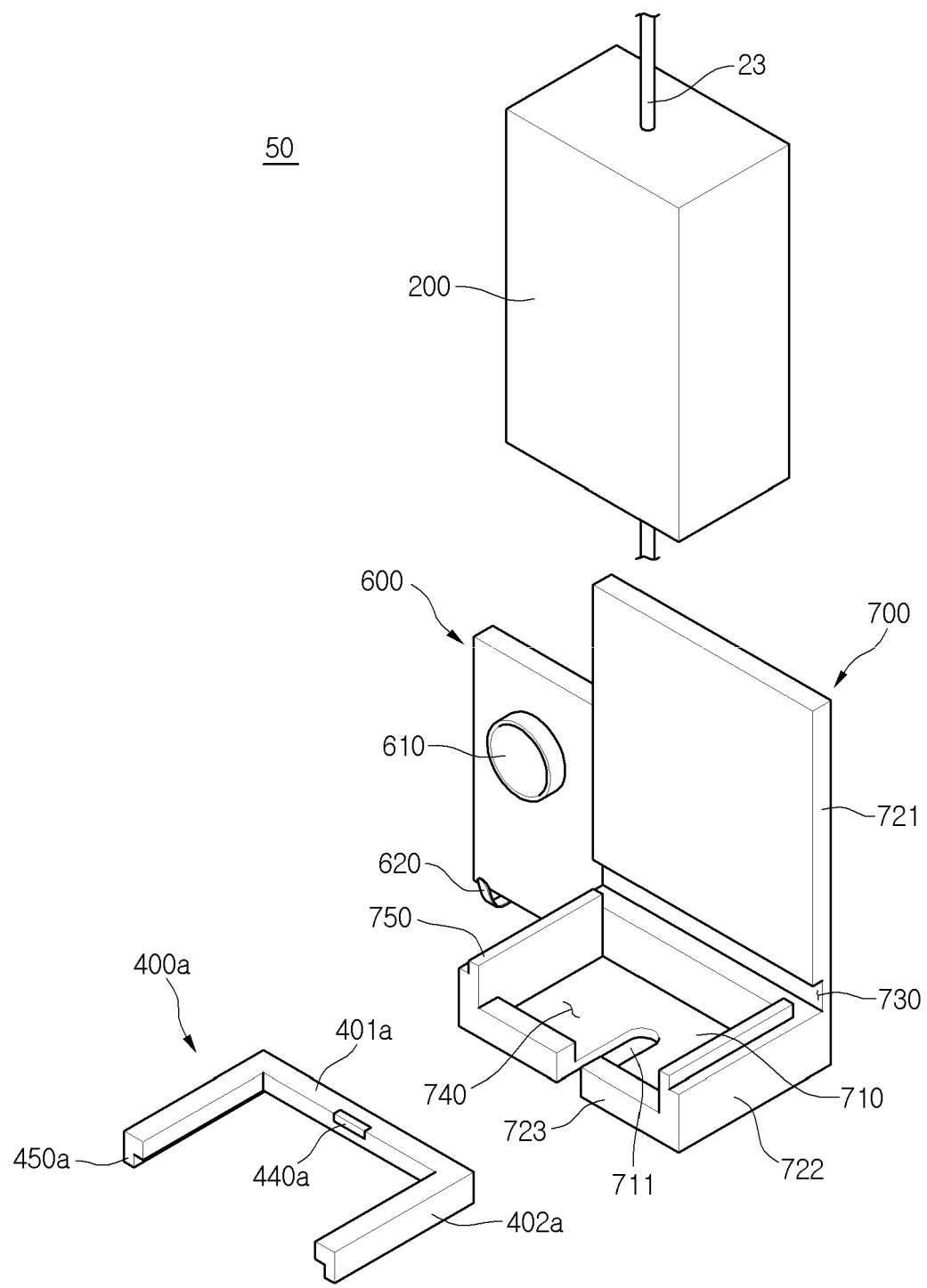
FIG. 9 is an exploded perspective view of the charging device assembly of FIG. 8.

Referring to FIGS. 8 and 9, the second guide portion 750 is located to be mutually slidable with the first guide portion 450a of the ad-on communication device 400.

The second guide portion 750 projects upwards from top ends of the left and right side portions 722 and are extended forward and backward.

The first guide portion 450a may be located outside left and right of the second guide portion 750 or may be located inside left and right of the second guide portion 750. Also, the first guide portion 450a and the second guide portion 750 are provided as a pair thereof, respectively, in such a way that one of the first guide portions 450a may be provided outside the second guide portion 750 and another may be provided inside the second guide portion 750. When attach or detach the ad-on communication device 400, the first guide portion 440 and the second guide portion 750 are slid in contact with each other.

On the other hand, the sub-bracket 600 may be provided outside the left and right side portions 722. The sub-stand 600 is formed with a connector insertion portion 610 available for inserting the electric vehicle connector 21. An opening of the connector insertion unit 610 may be formed on a side or a front thereof.

On the other hand, the sub-bracket 600 may be provided with a cable bracket 620. The cable bracket 620 may have a shape projecting forward and then bent upwards. The cable bracket 620, as shown in FIG. 6, may allow the power cable 23 to be rolled up thereon.

Hereinafter, operations of the charging device assembly 50 having a configuration described above will be described. Since fundamental operational principals of the charging device assembly are identical to the previous embodiment described above, hereinafter, coupling among the main bracket 700, the charge control device 200, and the ad-on communication device 400 will be described.

The user connects the cable plug 25 provided on one end of the power cable 23 to the socket 30, which is the power supply unit, and connects the electric vehicle connector 21 to the electric vehicle, thereby charging the electric vehicle.

While charging the electric vehicle, both the charge control device 200 and the ad-on communication device 400 may be mounted on the main bracket 700.

Both the charge control device 200 and the ad-on communication device 400 move forward and backward and are attached to or detached from the main bracket 700. When being mounted, the charge control device 200 and the ad-on communication device 400 move backward. When being separated, the charge control device 200 and the ad-on communication device 400 move forward.

When the ad-on communication device 400 moves from a state shown in FIG. 9 to a state shown in FIG. 8, the ad-on communication device 400 moves backward and a part of a backend of the ad-on communication device 400 is inserted into and fixed to the inside of the ad-on communication device mounting portion 730.

After coupling the ad-on communication device 400, the charge control device 200 is moved backward and is coupled with the main bracket 700. In this process, the power cable 23 is inserted into a cable pass portion 711 formed on the bottom portion 710. When being coupled with the main bracket 700, the charge control device 200 is located in the charge control device containing portion 740.

When the charge control device 200 and the ad-on communication device 400 are mounted on the charge control device containing portion 740 and the ad-on communication device mounting portion 730, the ad-on device communication unit 210 of the charge control device 200 and the charge control device communication unit 440 of the ad-on communication device 400 will be disposed in locations corresponding to each other to be mutually adjacent. Accordingly, the locations allow wireless short-distance communication such as IR-ray communication to be smoothly performed.

Accordingly, the user may communicate with the ad-on communication device 400 in a short distance only by mounting the charge control device 200 on the main bracket 700. That is, an additional process for coupling the ad-on communication device 400 with the charge control device 200 is unnecessary.

Accordingly, the electric vehicle connector 21 is connected to the electric vehicle and the cable plug 25 is connected to the socket 30, respectively, and then the charge control device 200 is mounted on the main bracket 700, thereby checking the charging operation and state of the electric vehicle through the terminal 300 while being indoors or in a long distance.

On the other hand, when not being charged, the electric vehicle connector 21 is inserted into the insertion unit 610 of the sub-bracket 600 and the power cable 23 is rolled up on the cable bracket 620 to be stored, thereby being neatly arranged and stored.

Figure 10:
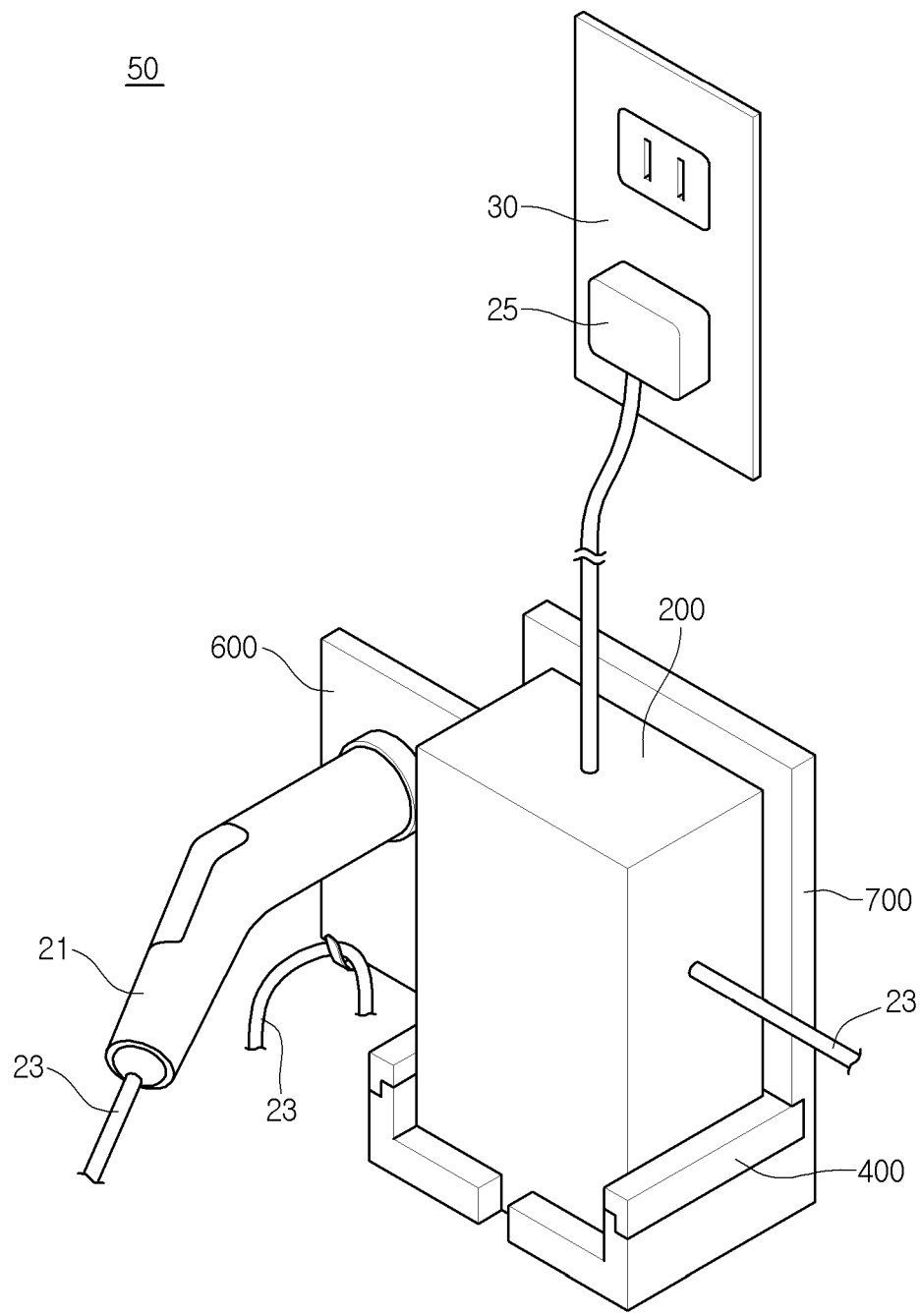
FIG. 10 is a perspective view of a charging device assembly for the electric vehicle according to still another embodiment.

In FIG. 10, comparing with FIG. 8, only a side, to which the power cable 23 is connected, is changed.

The power cable 23 may be coupled with both ends of the charge control device 200 to be symmetric, respectively. However, as shown in FIG. 10, the power cable 23 may be coupled with one side and another side vertical thereto.

In this case, the cable pass portion 711 provided on the bottom portion 710 may be omitted.

According to the embodiment, a charge control device for an electric vehicle may allow a user to check charging operations and state in a long distance through wireless communication.

Also, respective components forming the charge control device are attached to or detached from brackets, thereby being easily arranged and contained, which is available not only when charging the electric vehicle but also when not charging the electric vehicle.

Also, when the respective components forming the charge control device on the brackets, communication units of a charge control device and an ad-on communication device are allowed to be disposed adjacently to each other, thereby easily performing wireless short-distance communication between both the charge control device with the ad-on communication device without additional operations for coupling the charge control device with the ad-on communication device. For example, IR-ray communication, etc. may be easily performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging device assembly for an electric vehicle, the assembly comprising:
    a cable connecting the electric vehicle to a power supply unit;
    a charge control device coupled with the cable;
    a main bracket detachably coupled to the charge control device; and
    an ad-on communication device coupled to the main bracket,
    wherein the charge control device comprises an ad-on communication unit configured to perform wireless short-distance communication,
    wherein the ad-on communication device comprises:
        a charge control device communication unit configured to perform wireless short-distance communication with the ad-on communication unit; and
        a terminal communication unit configured to communicate wirelessly with a terminal displaying a charging operation or a state of the electric vehicle,
    wherein when the charge control device is coupled with the main bracket, the ad-on communication unit of the main bracket and the charge control device communication unit of the ad-on communication device are disposed at corresponding adjacent positions,
    wherein the ad-on communication device is detachably coupled to the main bracket, and
    wherein the ad-on communication unit is disposed to be proximate to one surface of the charge control device, wherein the one surface is adjacent to the charge control device communication unit when the charge control device is coupled with the main bracket.

2. The assembly of claim 1, wherein the charge control device comprises an infrared (IR) light emitting diode and the ad-on communication device comprises an IR light receiving diode respectively to perform infrared communication.

3. The assembly of claim 1, wherein the charge control device is configured to be slidably coupled to the main bracket.

4. The assembly of claim 3, wherein the main bracket comprises:
    a bottom portion; and
    side portions extending from the bottom portion; and
    at least one mounting portion configured to support the ad-on communication device wherein a first sub-portion of the at least one mounting portion has a first height and a second sub-portion of the at least one mounting portion has a second height smaller than the first height.

5. The assembly of claim 1, wherein the ad-on communication device comprises:
    a central portion; and
    a first side portion and a second side portion extending from opposite ends of the central portion and parallel to each other;
    wherein the charge control device is disposed between the first and second side portions.

6. The assembly of claim 5, wherein:
    the first and second side portions comprise first guide portions,
    the main bracket comprises second guide portions disposed to correspond to the first guide portions, and
    the first guide portions and the second guide portions are configured to be slidably coupled to each other.

7. The assembly of claim 1, further comprising:
    an electric vehicle connector configured to be connected to the electric vehicle; and
    a sub-bracket provided adjacent to an external side of the main bracket and configured to accommodate the electric vehicle connector to be mounted.

8. The assembly of claim 7, wherein the sub-bracket comprises:
    a connector insertion unit configured to accommodate insertion of at least part of the electric vehicle connector; and
    a cable bracket extending from the sub-bracket and configured to receive the cable to be mounted.

9. The assembly of claim 4, wherein the bottom portion comprises a cable pass opening configured to allow the cable to pass through.

10. The assembly of claim 4, wherein:
   the side portions comprise a rear portion, a pair of side portions, and a front portion, and
   the rear portion is higher than the pair of side portions and the front portion.

11. The assembly of claim 10, wherein the at least one mounting portion comprises:
   a first mounting element extending from a corner, wherein the corner is defined by an intersection of the front portion and one of the pair of side portions; and
   a second mounting element disposed at the rear portion and defined by an indentation at a side of the rear portion.

* * * * *